No. 850,983. PATENTED APR. 23, 1907.
W. F. VALIQUETTE.
PLATE AND PAN LIFTER.
APPLICATION FILED JUNE 23, 1906.

WITNESSES:
D. E. Carlsen
E. C. Carlsen

INVENTOR.
William F. Valiquette.
BY his ATTORNEY.
A. M. Carlsen.

UNITED STATES PATENT OFFICE.

WILLIAM F. VALIQUETTE, OF LA CROSSE, WISCONSIN, ASSIGNOR OF ONE-HALF TO ALLEN M. SHORT, OF MEDFORD, OREGON.

PLATE AND PAN LIFTER.

No. 850,983.      Specification of Letters Patent.      Patented April 23, 1907.

Application filed June 23, 1906. Serial No. 323,064.

*To all whom it may concern:*

Be it known that I, WILLIAM F. VALIQUETTE, a citizen of the United States, residing at La Crosse, in the county of La Crosse and State of Wisconsin, have invented certain new and useful Improvements in Plate and Pan Lifters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to devices for lifting and moving pie-plates and baking and cooking pans and vessels in general while they are too hot for handling with the bare hands; and the object of the invention is to provide an improved device of said class.

Figure 1:
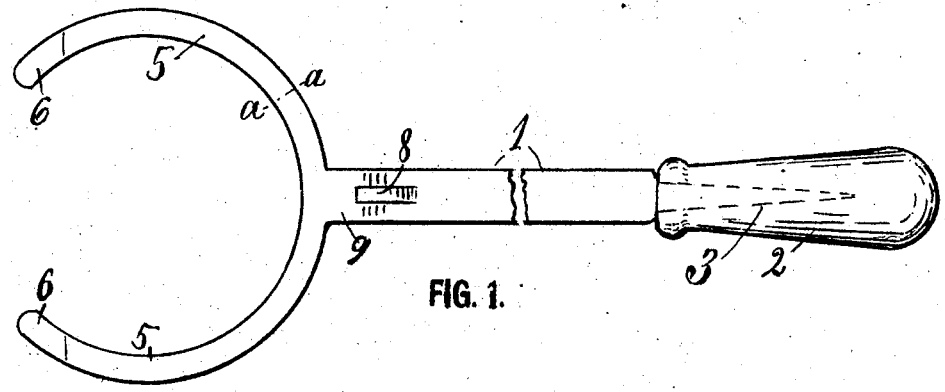
Figure 2:
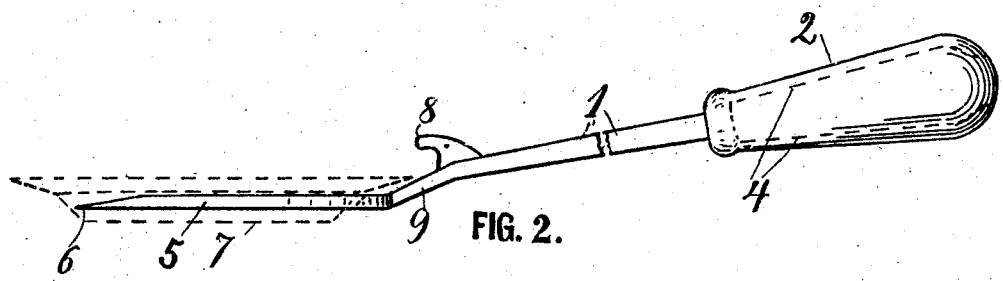
Figure 3:

In the accompanying drawings, Figure 1 is a top or plan view of my improved plate and pan lifter. Fig. 2 is a side view of Fig. 1 with the handle slightly modified and a pie-plate or other similar plate shown in dotted lines as supported by the device. Fig. 3 is a sectional view on the line *a a* in Fig. 1.

Referring to the drawings by reference-numerals, 1 designates a handle-bar about eight inches long or of any other desired length. One end of said bar is provided with a handle 2, which may be of wood and have the bar inserted into it, as shown at 3 in Fig. 1, or the handle may be cast integral with the bar, preferably of malleable iron, and cored out, as indicated by the dotted lines 4 in Fig. 2.

From the front end of the handle-bar extend two horizontally-curved arms 5, forming about three-fourths of a circle and having their ends flattened down to thin wedge-shaped points 6, adapted to be easily pushed in under any plate, pan, or like vessel and guide the same upon the arms 5, either entirely or partly suspended between the arms, as indicated in Fig. 2, where 7 designates a pie-plate or other similar plate partly embraced and partly supported on the arms 5.

In Fig. 3 is shown how the arms 5 are preferably beveled inward, so as to be more apt to fit the beveled or sloping sides of plates and other vessels.

8 is a hook-shaped guard adapted to stop the plate or other vessel from getting too far upon the handle-bar. It also serves in some cases to engage the upper edge of an extra-wide plate or vessel and prevent its tipping forward and down over the ends of the arms 5.

The wedge-shaped points 6, it will be observed, are beveled only at their upper side, while the lower side is in plane with the bottom side of the arm. This makes the device very easy to use, as the bottom of the arms may be dropped flat down upon the stove, oven-bottom, or oven-grate and simply pushed forward in under the plate or vessel to be lifted.

The handle-bar is near the arms 5 inclined upward at 9, so as to fairly resist ordinary vessels which may not reach the guard 8. The bar is then extended at a less steep incline to the handle 2.

Having thus described my invention, what I claim as new, and desire to secure by Letters Patent, is—

1. A lifting device for plates and pans, comprising a handle-bar with a handle at one end and at the other end a pair of horizontally-curved arms adapted to support or embrace and support the vessel lifted; said arms having their ends reduced to wedges with horizontal edges.

2. A lifting device for plates and pans, comprising a handle-bar with handle at one end and at the other end a pair of horizontally-curved arms adapted to pick up and support plates or other vessels, said arms having their upper sides beveled down and inward toward the center of the space between the arms.

3. A lifting device for plates and pans, comprising a handle-bar or handle, a pair of horizontally-curved flat arms at the front end of the handle, and near the junction of the handle and the arms a hook-shaped guard adapted to assist in holding the vessel supported on the arms.

4. A lifting device for plates and other vessels, comprising a handle-bar, a handle at one end thereof and a pair of horizontally-curved arms at the other end; said arms being flattened down at their points to wedges having their under side in plane with the under side of the arm; and means for preventing the vessel from moving too far in upon the arms.

In testimony whereof I affix my signature in presence of two witnesses.

WILLIAM F. VALIQUETTE.

Witnesses:
J. H. DAVIS,
R. V. KNIGHT.